Figure 1:
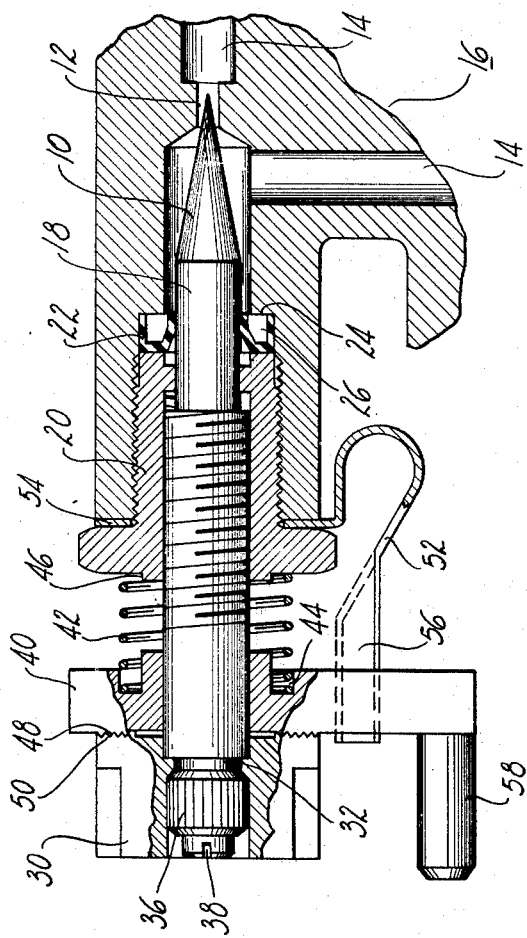

Sept. 9, 1952  E. O. WIRTH ET AL  2,610,024
FUEL METERING JET ADJUSTMENT
Filed May 9, 1947

INVENTORS
EMIL O. WIRTH
FREDERIK BARFOD
BY M. A. Hobbs
ATTORNEY

Patented Sept. 9, 1952

2,610,024

UNITED STATES PATENT OFFICE 2,610,024

FUEL METERING JET ADJUSTMENT

Emil O. Wirth and Frederik Barfod, South Bend, Ind., assignors to Bendix Aviation Corporation, South Bend, Ind., a corporation of Delaware Application May 9, 1947, Serial No. 747,113

6 Claims. (Cl. 251—164)

The present invention relates to a fluid control device and more particularly to an adjustment mechanism for controlling the size of a variable metering orifice in a fuel system of an internal combustion engine.

One of the principal objects of the present invention is to provide an adjustable device for accurately controlling the effective size of a variable orifice.

Another object of the invention is to provide an adjustable valve mechanism for a variable size orifice wherein the effective area of said orifice can be minutely and accurately controlled and yet readily varied over a relatively wide range.

Still another object of the invention is to provide an adjustable valve mechanism for a fuel metering orifice in an engine fuel system wherein an adjustment can be accurately made and the setting of the valve thereafter changed to obtain certain desired metering characteristics without disturbing the accuracy of the original adjustment.

A further object is to provide a manual mixture control for carburetors wherein the effective size of the metering orifice may be accurately adjusted and thereafter regulated over a relatively wide range to obtain a lean fuel-air mixture for normal operation and a rich mixture for starting and high power output.

Figure 2:
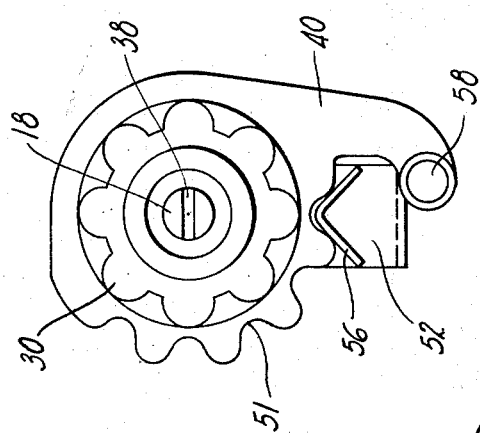

Other objects and advantages will be apparent from the following description and accompanying drawings wherein one specific embodiment of the invention is given. The invention in its broadest aspect includes a valve for controlling the effective size of an orifice, in which one adjustment is provided for establishing the initial correct relationship between the orifice and valve, and another adjustment is provided for regulating the valve during operation to obtain various desired settings, the two adjustments having interrelated locking means adapted to permit easy and accurate adjustment of the valve while said valve is in use. The invention may be clearly understood by referring to the drawings, in which:

Figure 1 is a cross-section through a valve embodying the present invention and through a portion of a device having a fluid conduit with a restriction therein; and Figure 2 is an end view of the valve showing the handles of the two adjustment means.

The fluid control mechanism shown in the drawings includes a needle valve 10 adapted to extend into an orifice or restriction 12 in a fluid conduit 14 of a device 16, such as for example, a fuel metering device of an engine. The needle valve 10 is integrally joined to a valve stem 18 which is threadedly received in a bushing 20 and sealed against fluid leakage from conduit 14 by a resilient gasket 22 inserted between the inner end of bushing 20 and a shoulder 24 in bore 26 of device 16, said bushing being threaded into said bore and held against unintentional rotation by a set screw or any other suitable means. A round knob 30, provided with a fluted periphery to form a suitable hand grip is rigidly mounted on the outer end of valve stem 18 and is preferably formed of a plastic material such as Bakelite molded into place around the end of said stem. An annular groove 32 and the serrations 36 on the end portion of stem 18 are provided to prevent movement of said knob relative to said stem. The end of stem 18 extends to the outer end of knob 30 and is provided with a slot 38 so that a screw driver may be used in regulating valve 10 in the event the valve and the adjustments therefor are so placed on the device that said knob would be relatively inaccessible.

A lever 40 is mounted on valve stem 18 between knob 30 and bushing 20 and is resiliently held against the inner side of said knob by a coil spring 42 reacting between the outer end of bushing 20 and the bottom of an annular groove 44 on the inner side of said lever, said annular groove and boss 46 being provided to prevent lateral movement of said spring. Unintentional movement of lever 40 relative to knob 30 is prevented by interlocking serrations 48 and 50 on the outer side of said lever and on the inner side of knob 30. In the adjustment of knob 30 relative to lever 40, said lever is forced axially in opposition to spring 42 until the serrations on the lever are disengaged from the serrations on the knob 30; thereafter knob 30 can be rotated without any interference by the lever to make any desired adjustment of the valve 10 relative to orifice 12. After the adjustment is made and the lever released, spring 42 moves said lever axially into contact with said knob and interlocks the two sets of serrations. A number of slots 51 are provided on the periphery of lever 40 which represent positions of said lever for various settings of the valve 10. While these slots are shown equally spaced from one another and covering only a relatively small portion of the periphery, they may be spaced various distances apart and distributed nearly around the entire periphery of the lever if the control of the valve so requires.

A latch or locking means 52 is provided to hold lever 40 in any one of its adjusted positions and consists of a spring steel clip having a perforated flat end 54 mounted on bushing 20 and rigidly secured in place between the head of said bushing and the body of device 16. The latch is so formed that the free end 56 thereof seats in slots 51 in the periphery of lever 40 in such a manner that it can readily be forced out of said slots when the lever is rotated in either direction in making an adjustment of the valve. A handle 58 is provided to facilitate the manual adjustment of said lever.

When the present valve construction is assembled on a new fuel metering device or the like, the needle valve 10 will very probably not be correctly positioned in relation to orifice 12. To make the initial adjustment, lever 40 is moved axially on stem 18 away from knob 30 in opposition to spring 42 until serrations 48 on the lever and the serratons 50 on the knob 30 are disengaged. While the knob and lever are held apart, said knob and valve stem 18 are rotated without rotating lever 40. As the knob is rotated clockwise, the threads on stem 18 turning in the threads in the bushing 20 move needle valve 10 toward or further into orifice 12, thus decreasing the effective size of said orifice. By the same procedure, as the knob is rotated counterclockwise, the needle valve is withdrawn from the orifice, thus increasing the effective size of said orifice. When this adjustment has been made, spring 42 is permitted to reseat lever 40 against knob 30 interlocking the two sets of serrations. Thereafter, to adjust the valve to obtain various desired fuel metering characteristics, lever 40 is rotated, for example, in a clockwise direction to lean the fuel-air mixture or in a counterclockwise direction to enrich said mixture. The farthest position in the clockwise direction may be idle cut-off in which valve 10 completely closes orifice 12, and the farthest position in the counterclockwise direction may be the position for priming the engine for starting. Once the adjustment is made, latch 52 seating in one of slots 51, prevents unintentional movement of lever 40 from the desired position.

Many modifications of the present invention will be apparent to those skilled in the art and the use of any or all of the ramifications of the invention falling within the scope of the appended claims is contemplated. It is further understood that the present valve construction may be readily adapted to many different types of devices wherein it is desired to accurately control the flow of fluid through an orifice or conduit.

We claim:

1. A fluid control for an orifice in a device, comprising a needle valve for said orifice, a stem for said valve adapted to be threadedly received in a tapped member of said device, a knob mounted on the end of said stem opposite said valve and adapted to rotate therewith, a lever rotatably mounted on said stem between said member and said knob and adapted to move axially on said stem, means on said lever and said knob to prevent relative movement therebetween when in contact with one another, a spring for urging said lever and knob into contact, a plurality of slots in the periphery of said lever, and a yieldable latching means adapted to seat in said slots and prevent accidental movement of said lever and said knob.

2. A fluid control means for an orifice in a device, comprising a valve for said orifice, a stem for said valve having a threaded portion thereon adapted to be received in a tapped member of said device, a knob mounted on the end of said stem opposite said valve and adapted to rotate in unison therewith, a lever rotatably mounted on said stem between said member and said knob and adapted to move axially on said stem, said lever and said knob each having a serrated portion adapted to become interlocked when said lever and knob are in contact, a spring means for urging said lever and knob into contact, at least one slot in the periphery of said lever, and a latching means adapted to prevent accidental movement of said lever.

3. A fluid control for an orifice in a device comprising a tapered valve for said orifice, a stem for said valve adapted to be threadedly received in a tapped member of said device, a knob mounted on the end of said stem opposite said valve and adapted to rotate in unison therewith, a lever rotatably mounted on said steem between said member and said knob and adapted to move axially on said stem, said lever and said knob each having a serrated portion adapted to become interlocked when said lever and knob are in contact, a spring means adapted to urge said lever and knob into contact, a plurality of slots in the periphery of said lever, and a yieldable latching means adapted to seat in said slots and prevent the movement of said lever and said knob.

4. A fluid control for an orifice in a fuel metering device, comprising a needle valve, a stem for said valve adapted to be threadedly received in a tapped member of said device, a knob mounted on the end of said stem opposite said valve and adapted to rotate in unison therewith, a lever rotatably mounted on said stem between said member and said knob and adapted to move axially on said stem, said lever and said knob each having a serrated portion adapted to become interlocked when said lever and knob are in contact, a yieldable means for urging said lever and knob into contact, a plurality of slots in the periphery of said lever, one of said slots representing a lean fuel-air mixture and another a rich fuel-air mixture, and a yieldable latching means adapted to seat in said slots and prevent accidental movement of said lever and said knob.

5. In a fluid control for a fuel metering device having a fuel orifice therein: a valve for said orifice, a stem for said valve adapted to be threadedly received in a tapped member of said device, a knob rigidly secured on the end of said stem opposite said valve for making the initial adjustment of said valve relative to said orifice, a lever rotatably mounted on said stem between said member and said knob and adapted to move axially on said stem, serrations on said lever and said knob to prevent relative movement therebetween when in contact with one another, a spring reacting between said member and said lever for urging said lever and knob into contact, a plurality of slots in the periphery of said lever, one of said slots representing a lean fuel-air mixture and another a rich fuel-air mixture, and a latching means adapted to prevent accidental movement of said lever.

6. A fluid control device for an orifice, comprising a valve portion, a valve stem having a threaded portion for adjusting said valve portion relative to said orifice, a knob rigidly secured on one end of said valve stem, a lever rotatably mounted on said stem between said knob and said threaded portion and adapted to slide axially on said stem, means for preventing relative rotation between said lever and knob when said lever and knob are in contact with one another, spring means for urging said lever and knob into contact, and a stop means for limiting the rotational movement of said lever.

EMIL O. WIRTH.
FREDERIK BARFOD.

REFERENCES CITED

The following references are of record in the file of this patent:

UNITED STATES PATENTS

| Number | Name | Date |
|---|---|---|
| 1,631,109 | Hitzemann | May 31, 1927 |
| 1,683,153 | Bishop | Sept. 4, 1928 |
| 1,746,055 | Roberts | Feb. 4, 1930 |
| 2,234,052 | Luenz | Mar. 4, 1941 |